(12) United States Patent
Edelmann et al.

(10) Patent No.: US 11,053,980 B2
(45) Date of Patent: Jul. 6, 2021

(54) ROLLING-ELEMENT BEARING UNIT AND ASSEMBLY METHOD

(71) Applicant: AKTIEBOLAGET SKF, Gothenburg (SE)

(72) Inventors: Ludwig Edelmann, Sulzthal (DE); Dominic Namyslo, Gädheim (DE); Matthias Schuler, Stadtlauringen (DE); Johannes Zang, Schweinfurt (DE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 16/703,153

(22) Filed: Dec. 4, 2019

(65) Prior Publication Data
US 2020/0217359 A1    Jul. 9, 2020

(30) Foreign Application Priority Data

Jan. 8, 2019 (DE) .......................... 102019200146.7

(51) Int. Cl.
*F16C 33/78* (2006.01)
*F16C 43/04* (2006.01)
*F16C 19/26* (2006.01)

(52) U.S. Cl.
CPC .......... *F16C 33/7886* (2013.01); *F16C 19/26* (2013.01); *F16C 33/7823* (2013.01); *F16C 33/7866* (2013.01); *F16C 43/045* (2013.01)

(58) Field of Classification Search
CPC .... F16C 33/60; F16C 33/605; F16C 33/7886; F16C 33/7813; F16C 41/007; F16C 2226/74; F16C 19/26; F16C 33/7823; F16C 33/7866; F16C 43/045; F16C 33/7896

See application file for complete search history.

(56) References Cited

U.S. PATENT DOCUMENTS

| | | | | |
|---|---|---|---|---|
| 4,336,971 A | * | 6/1982 | Reiter ..................... | B21B 31/07 384/484 |
| 4,350,398 A | * | 9/1982 | Schulz .................. | F16C 19/364 384/569 |
| 4,884,901 A | * | 12/1989 | Harsdorff ............ | F16C 33/7886 384/448 |
| 6,062,734 A | * | 5/2000 | Bundgart ............ | F16C 33/7886 384/477 |
| 6,241,396 B1 | * | 6/2001 | Shimomura .......... | B21B 31/078 277/551 |
| 2001/0002939 A1 | * | 6/2001 | Aizawa ................. | F16C 19/388 384/477 |
| 2012/0201486 A1 | * | 8/2012 | Ito .......................... | F16C 33/80 384/448 |
| 2014/0177991 A1 | * | 6/2014 | Toyoda ................. | F16C 19/388 384/480 |
| 2015/0247532 A1 | * | 9/2015 | Suzuki ............... | F16C 33/6674 384/462 |

(Continued)

*Primary Examiner* — Alan B Waits
(74) *Attorney, Agent, or Firm* — J-Tek Law PLLC; Scott T. Wakeman; Mark A. Ussai

(57) ABSTRACT

A rolling-element bearing unit includes at least one outer ring, at least one inner ring, a plurality of rolling elements disposed between the at least one outer ring and the at least one inner ring that are in contact with the at least one outer ring and the at least one inner ring and at least one auxiliary ring attached to an axial end region of the outer ring. The auxiliary ring may include a seal assembly and may be connected to the at least one outer ring with a snap fit.

7 Claims, 2 Drawing Sheets

(56) References Cited

U.S. PATENT DOCUMENTS

| | | | |
|---|---|---|---|
| 2017/0175815 A1* | 6/2017 | Suzuki | F16C 19/364 |
| 2017/0370418 A1* | 12/2017 | Edelmann | F16C 35/077 |
| 2018/0003236 A1* | 1/2018 | Edelmann | F16C 33/7823 |
| 2018/0073480 A1* | 3/2018 | Kleczewski | F02P 1/005 |
| 2019/0055989 A1* | 2/2019 | Hamada | F16C 33/768 |

* cited by examiner

ROLLING-ELEMENT BEARING UNIT AND ASSEMBLY METHOD

CROSS-REFERENCE

This application claims priority to German patent application no. 10 2019 200 146.7 filed on Jan. 8, 2019, the contents of which are fully incorporated herein by reference.

TECHNOLOGICAL FIELD

The present disclosure is directed to a rolling-element bearing unit having an auxiliary ring connected to the outer ring for supporting a seal.

BACKGROUND

Known rolling-element bearing units include an outer ring, an inner ring, a cage, and a number of rolling elements that contact the outer ring and the inner ring and that are disposed in intermediate spaces (pockets) of the cage. The respective outer rings are specifically designed and manufactured for truck wheel bearings. In preassembled bearings, the outer ring is elongated and additionally ground in order to be able to manufacture bearings with preinstalled seals.

SUMMARY

An aspect of the disclosure is to provide a rolling-element bearing unit of the above-described type having increased efficiency.

A rolling-element bearing unit is according to the disclosure includes at least one outer ring, at least one inner ring, a number of rolling elements that contact the outer ring and the inner ring, and at least one component, such as an auxiliary ring, that is disposed at an axial end region of the rolling-element bearing unit and axially adjacent to the outer ring, wherein the component is attached to the outer ring. According to the disclosure an increased efficiency can be achieved. In particular a cost-effective design and a low weight can be achieved, since the outer ring can be shortened in comparison to the prior art. In particular, due to the possible shorter axial dimension, a standard outer ring can be used that is already produced in large numbers and thus cost-effectively.

The rolling-element bearing unit may further include a seal that is attached to the component. A simple assembly can thereby be achieved.

The seal advantageously includes a metal plate that is configured L-shaped in an axial section. A cost-effective design of the metal plate can thereby be achieved.

Portions of the rolling-element bearing unit that lie radially outward of a leg of the metal plate preferably do not include any gaps in communication with the interior region of the rolling-element bearing unit. The quantity of grease that is required for lubricating the rolling-element bearing unit is therefore low, since the existence of radially and axially outer-lying space wherein grease can be deposited is avoided, and in addition the reflux of grease to raceways of the inner ring and of the outer ring and to rolling surfaces of the rolling elements is improved by the structural avoidance of such a space.

The component may also include at least one region that, together with the inner ring, forms a gap seal. A separate installation of an element that includes such a region is therefore unnecessary. In particular an economical design and assembly can be achieved.

Another aspect of the disclosure comprises a rolling-element bearing unit that includes at least one outer ring, at least one inner ring, a plurality of rolling elements disposed between the at least one outer ring and the at least one inner ring in contact with the at least one outer ring and the at least one inner ring and at least one auxiliary ring attached to an axial end region of the outer ring. The auxiliary ring includes an axially extending leg having a radially outwardly facing rib having an outer diameter, the axial end region of the outer ring has a radially inwardly facing groove, and the rib is mounted in the groove to retain the auxiliary ring on the outer ring. The auxiliary ring may be made from Nylon 66, and the auxiliary ring and the at least one outer ring may be configured such that the auxiliary ring is attachable to the at least one outer ring by a snap fit.

Further advantages arise from the following description of the drawings. An exemplary embodiment of the invention is depicted in the drawings. The drawings, the description, and the claims contain numerous features in combination. The person skilled in the art will also advantageously consider the features individually and combine them into further meaningful combinations.

DETAILED DESCRIPTION

Figure 1:
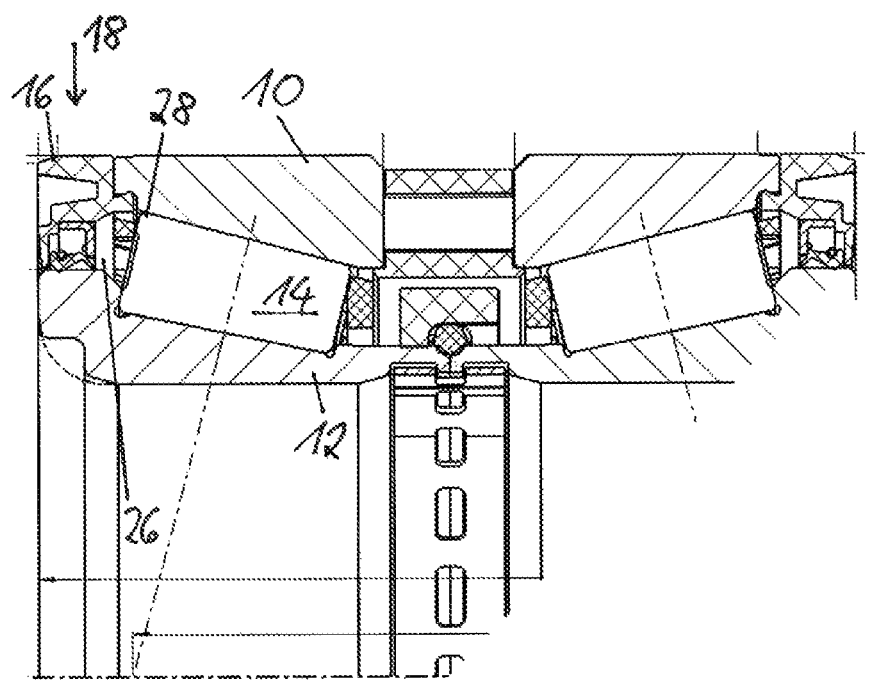
FIG. 1 is an axial section through a portion of a rolling-element bearing unit according to the present disclosure which includes a component in the form of an auxiliary ring.
Figure 2:
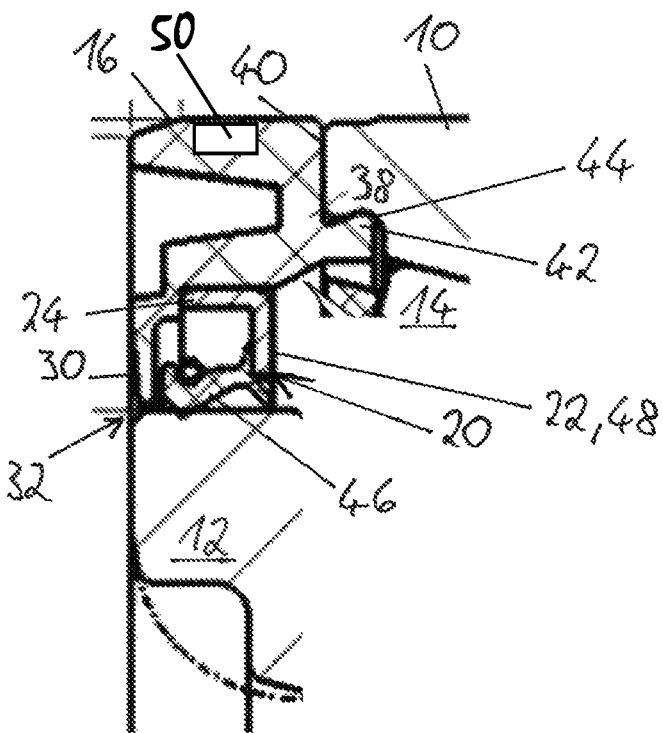
FIG. 2 is an enlarged portion of FIG. 1.
Figure 3:
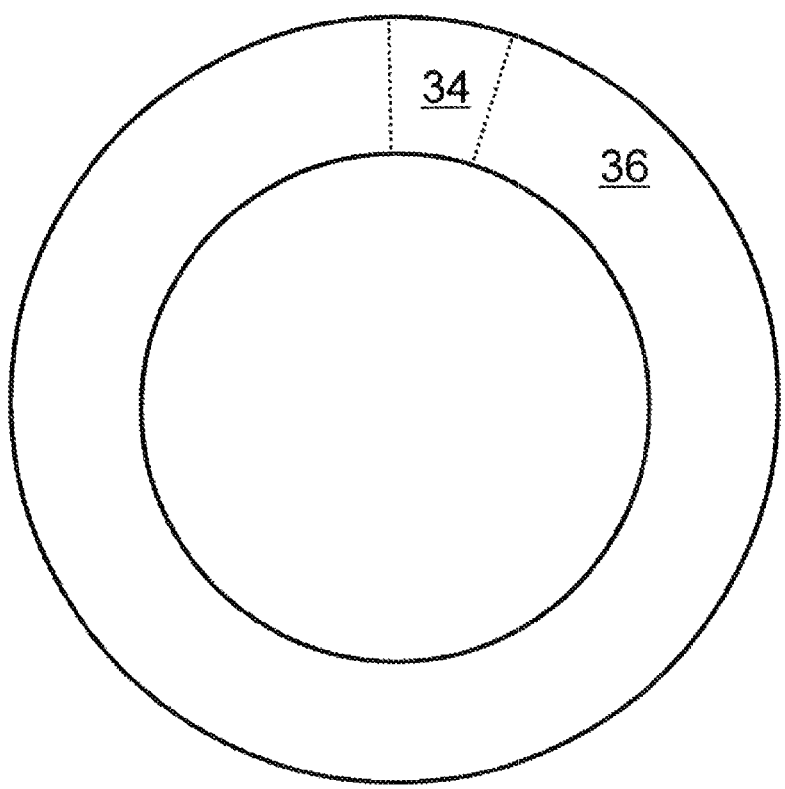
FIG. 3 is a schematic view of an end side of the auxiliary ring of FIG. 1.

FIG. 1 shows a part of an axial section through a rolling-element bearing unit that includes an outer ring 10, an inner ring 12, and a number of rolling elements 14 that contact the outer ring and the inner ring. The rolling-element bearing unit further includes a component 16 that is disposed at an axial end region 18 of the rolling-element bearing unit and axially adjacent to the outer ring (FIGS. 1 and 2). The component is attached to the outer ring in an interference-fit manner, and specifically a snap lug 42 of the component is snapped-in into a groove 44 of the outer ring. The snap lug 42 is sometimes referred to herein as a "rib" or a "radially outwardly facing rib."

Furthermore the rolling-element bearing unit comprises a seal 20 that is attached to the component. The seal includes a metal plate 22 and an elastomer element 46 that sealingly abuts against the inner ring 12. In an axial section through the rolling-element bearing unit the metal plate 22 has an L-shape, including a leg 24 directed in the axial direction and a radially inwardly directed leg 48. The metal plate is pressed into the component by the leg 24. Radially outside the leg 24 the rolling-element bearing unit is free from regions of an interior 26 of the rolling-element bearing unit. The elastomer element 46 is attached primarily to the leg 48. The rolling elements each include a region 28 that lies radially farther outward than the metal plate.

The component is made of plastic, and specifically made of fiberglass-reinforced PA66 (Nylon 66). It includes a region 30 that together with the inner ring forms a gap seal 32. The gap seal is disposed on an axial outer side. It is also conceivable that the gap seal is disposed in the vicinity of the cage.

On one end side the component includes two different regions 34, 36 that have different colors. This simplifies the orientation of the component during an installation, in particular during an installation as a replacement part.

The rolling-element bearing unit can include a seal lip, made of an elastomer, in a region 38 of the component that faces the outer ring; the seal lip seals against the outer ring. This allows oil to be used for lubricating the rolling-element bearing unit. The component and the seal lip can be manufactured in a 2-component manner.

In addition, the rolling-element bearing unit can include a sensor 50, directly attached to the component 16, or even a plurality of sensors, for measuring one or more physical variables. A variable can be, for example, a temperature.

During an assembly of the rolling-element bearing unit the seal 20 is first attached to the component, and subsequently the component is fixed to an end side 40 of the outer ring by the snap lug 42 being pressed-in into the groove 44 by a pressing of up to 20 tons. During the pressing-in it is helpful that the metal plate 22 serves as a reinforcement of the component, whereby a deformation of the component radially inward is largely prevented.

In an alternative embodiment it is conceivable that the seal 20 is omitted and is completely replaced in its function by the gap seal.

In principle the component can optionally be embodied with a grease- or dirt-seal.

Overall the described rolling-element bearing unit is a compact and closed unit that is dust- and dirt-tight during an installation and its handling.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved rolling-element bearing units.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

10 Outer ring
12 Inner ring
14 Rolling element
16 Component
18 End region
20 Seal
22 Metal plate
24 Leg
26 Interior
28 Region
30 Region
32 Gap seal
34 Region
36 Region
38 Region
40 End side
42 Snap lug
44 Groove
46 Elastomer element
48 Leg
50 Sensor

What is claimed is:

1. A rolling-element bearing unit comprises:
at least one outer ring,
at least one inner ring,
a plurality of rolling elements disposed between the at least one outer ring and the at least one inner ring in contact with the at least one outer ring and the at least one inner ring, and
at least one auxiliary ring attached to an axial end region of the outer ring,
wherein the auxiliary ring includes an axially extending leg having a radially outwardly facing rib having an outer diameter,
wherein the axial end region of the outer ring has a radially inwardly facing groove, and
wherein the rib is mounted in the groove to retain the auxiliary ring on the outer ring, and
the bearing unit further including a seal assembly mounted to the auxiliary ring, the seal assembly including a plate that is L-shaped in axial section and includes an axial leg and a radial leg, the axial leg being in direct contact with the auxiliary ring,
wherein a portion of each of the plurality of rolling elements lies radially farther outward from an axis of rotation than the axial leg, and
wherein a radially inwardly extending leg of the auxiliary ring forms a gap seal with the inner ring.

2. The rolling-element bearing unit according to claim 1, wherein the rolling-element bearing unit includes an interior space configured to hold a lubricant, and
wherein the interior space does not extend between the axial leg and the auxiliary ring.

3. The rolling-element bearing unit according to claim 1, wherein the auxiliary ring includes a first circumferential region having a first color and a second circumferential region having a second color different than the first color.

4. The rolling-element bearing unit according to claim 1 including at least one sensor for measuring a physical quantity attached to the auxiliary ring.

5. The rolling element bearing unit according to claim 1, wherein the auxiliary ring is made from Nylon 66, and
wherein the auxiliary ring and the at least one outer ring are configured such that the auxiliary ring is attachable to the at least one outer ring by a snap fit.

6. The rolling-element bearing according to claim 1, wherein the at least one inner ring comprises a one-piece inner ring having a raceway, the plurality of rolling elements contacting the raceway, and
wherein the seal assembly includes an elastomeric seal element mounted on the plate and forming a seal with a surface of the inner ring.

7. A method of assembling the rolling-element bearing unit according to claim 1 comprising:
   snapping the auxiliary ring onto the at least one outer ring.

* * * * *